US011874615B2

(12) United States Patent
Shimizu et al.

(10) Patent No.: US 11,874,615 B2
(45) Date of Patent: Jan. 16, 2024

(54) DEVELOPING DEVICE INCLUDING DEVELOPER CARRYING MEMBER AND CONTAINING TWO-COMPONENT DEVELOPER AND IMAGE FORMING APPARATUS INCLUDING THE DEVELOPING DEVICE

(71) Applicant: KYOCERA Document Solutions Inc., Osaka (JP)

(72) Inventors: Tamotsu Shimizu, Osaka (JP); Akihiro Watanabe, Osaka (JP); Ryo Yamada, Osaka (JP); Uto Syu, Osaka (JP); Yuji Toyota, Osaka (JP); Yasuhiro Tauchi, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/859,669

(22) Filed: Jul. 7, 2022

(65) Prior Publication Data

US 2023/0022669 A1 Jan. 26, 2023

(30) Foreign Application Priority Data

Jul. 14, 2021 (JP) ................................ 2021-116258

(51) Int. Cl.
*G03G 15/08* (2006.01)
*G03G 15/09* (2006.01)

(52) U.S. Cl.
CPC ....... *G03G 15/0891* (2013.01); *G03G 15/081* (2013.01); *G03G 15/0921* (2013.01); *G03G 2215/0609* (2013.01)

(58) Field of Classification Search
CPC ........... G03G 15/0891; G03G 15/0921; G03G 15/081; G03G 15/0812; G03G 2215/0609
See application file for complete search history.

(56) References Cited

U.S. PATENT DOCUMENTS 5,446,526 A * 8/1995 Shimizu ............ G03G 15/0921 399/274
5,991,586 A 11/1999 Nagao .......................... 399/274
(Continued)

FOREIGN PATENT DOCUMENTS

JP 10-133481 A 5/1998
JP 11-327307 A 11/1999
JP 2005-92061 A 4/2005

*Primary Examiner* — Stephanie E Bloss
*Assistant Examiner* — Laura Roth
(74) *Attorney, Agent, or Firm* — Stein IP LLC

(57) ABSTRACT

A developing device includes a developing container, a first stirring conveyance member, a second stirring conveyance member, a developer carrying member including a developing sleeve and a magnet, and a regulation member. The regulation pole in the magnet has a region extending over 10° or more in which a maximum value of a vertical magnetic force is not more than 65 [mT] and a vertical magnetic force gradient is not more than 0.3 [mT/°]. A peak position of the vertical magnetic force gradient of the regulation pole is arranged at a position opposed to the second stirring conveyance member, and when a value of the vertical magnetic force gradient and a value of the vertical magnetic force at the peak position of the vertical magnetic force gradient are indicated as A [mT/°] and K [mT], respectively, $A \geq 2.8$ and $A \times K \geq 62.5$ are satisfied.

7 Claims, 3 Drawing Sheets

(56) References Cited

U.S. PATENT DOCUMENTS

| | | | | |
|---|---|---|---|---|
| 6,081,684 | A | 6/2000 | Naganuma et al. | 399/275 |
| 2018/0203376 | A1* | 7/2018 | Shimizu | G03G 15/0928 |

* cited by examiner

DEVELOPING DEVICE INCLUDING DEVELOPER CARRYING MEMBER AND CONTAINING TWO-COMPONENT DEVELOPER AND IMAGE FORMING APPARATUS INCLUDING THE DEVELOPING DEVICE

INCORPORATION BY REFERENCE

This application is based upon and claims the benefit of priority from the corresponding Japanese Patent Application No. 2021-116258 (filed on Jul. 14, 2021), the entire contents of which are incorporated herein by reference.

BACKGROUND

The present disclosure relates to a developing device that is mounted in an image forming apparatus including an image carrying member, such as a copy machine, a printer, a facsimile, or a multi-functional peripheral having functions thereof. The present disclosure relates particularly to a developing device that employs a two-component development method using a two-component developer including a toner and a carrier and an image forming apparatus including the same.

In an image forming apparatus, an electrostatic latent image formed on an image carrying member such as a photosensitive drum is developed by a developing device into a visible toner image. One type of such a developing device employs the two-component development method using a two-component developer including a magnetic carrier and a toner.

In the two-component development method, it is known to adopt a configuration in which a pumping pole (a catching pole) that pumps a developer supplied from a stirring member to a developing roller (a developer carrying member) and a regulation pole that regulates an amount of the developer conveyed on the developing roller are constituted of a single magnetic pole, thus reducing mechanical stress on the developer generated in a region (a regulation portion) in which a regulation member is opposed to the developing roller thereby to prevent deterioration of a toner. In this case, while it is possible to further reduce the stress by reducing a magnetic force of the regulation pole, under such a reduced magnetic force, stability (regulation stability) of a magnetic regulation force in the regulation portion might be decreased.

To address this issue, there has been proposed a method for ensuring the regulation stability by using a regulation pole having a reduced magnetic force and widening a pole width thereof. For example, a developing device has been disclosed in which a magnetic pole of a magnet member positioned in a region opposed to the regulation member has a region that exhibits a flat vertical magnetic force distribution of a relatively unvarying vertical magnetic force, and the regulation member is provided in a region of this magnetic pole in which a variation width of the vertical magnetic force is not more than 10 gauss.

The use of the regulation pole having a reduced magnetic force, however, presents another problem that supply of the developer from the stirring member might be decreased. When the pole width of the regulation pole is widened as in a configuration of Patent Literature 1, while performance in supplying the developer is somewhat improved, sufficient supply thereof still cannot be achieved, so that unevenness corresponding to the stirring member (unevenness corresponding to a pitch of a screw) might occur in an image.

SUMMARY

A developing device according to one aspect of the present disclosure includes a developing container, a first stirring conveyance member, a second stirring conveyance member, a developer carrying member, and a regulation member and is configured to develop an electrostatic latent image formed on a surface of an image carrying member into a toner image. The developing container includes a plurality of conveyance chambers including a first conveyance chamber and a second conveyance chamber that are arranged mutually side by side and contains a two-component developer including a magnetic carrier and a toner. The first stirring conveyance member conveys, while stirring, the developer present in the first conveyance chamber in a first direction. The second stirring conveyance member conveys, while stirring, the developer present in the second conveyance chamber in a second direction opposite to the direction of conveyance by the first stirring conveyance member. The developer carrying member is rotatably supported to the developing container and carries, on an outer circumferential surface thereof, the developer present in the second conveyance chamber. The regulation member is arranged to be opposed at a prescribed distance to the developer carrying member. The developer carrying member includes a developing sleeve and a magnet. The developing sleeve is rotatable, carries the developer, and has a surface on which a magnetic brush is formed. The magnet is unrotatably secured in the developing sleeve and has a plurality of magnetic poles circumferentially arranged at prescribed intervals, which includes a regulation pole that is arranged at a position opposed to the regulation member and a main pole that is arranged on a downstream side of the regulation pole with respect to a rotation direction of the developing sleeve. In the magnet, the regulation pole and a pumping pole that pumps the developer supplied from the second stirring conveyance member to the developer carrying member are constituted of a single magnetic pole. The regulation pole has a region extending over 10° or more in which a maximum value of a vertical magnetic force is not more than 65 [mT] and a vertical magnetic force gradient is not more than 0.3 [mT/°]. A peak position of the vertical magnetic force gradient of the regulation pole is arranged at a position opposed to the second stirring conveyance member, and when a value of the vertical magnetic force gradient and a value of the vertical magnetic force at the peak position of the vertical magnetic force gradient are indicated as A [mT/°] and K [mT], respectively, $A \geq 2.8$ and $A \times K \geq 62.5$ are satisfied.

DETAILED DESCRIPTION

Figure 1:
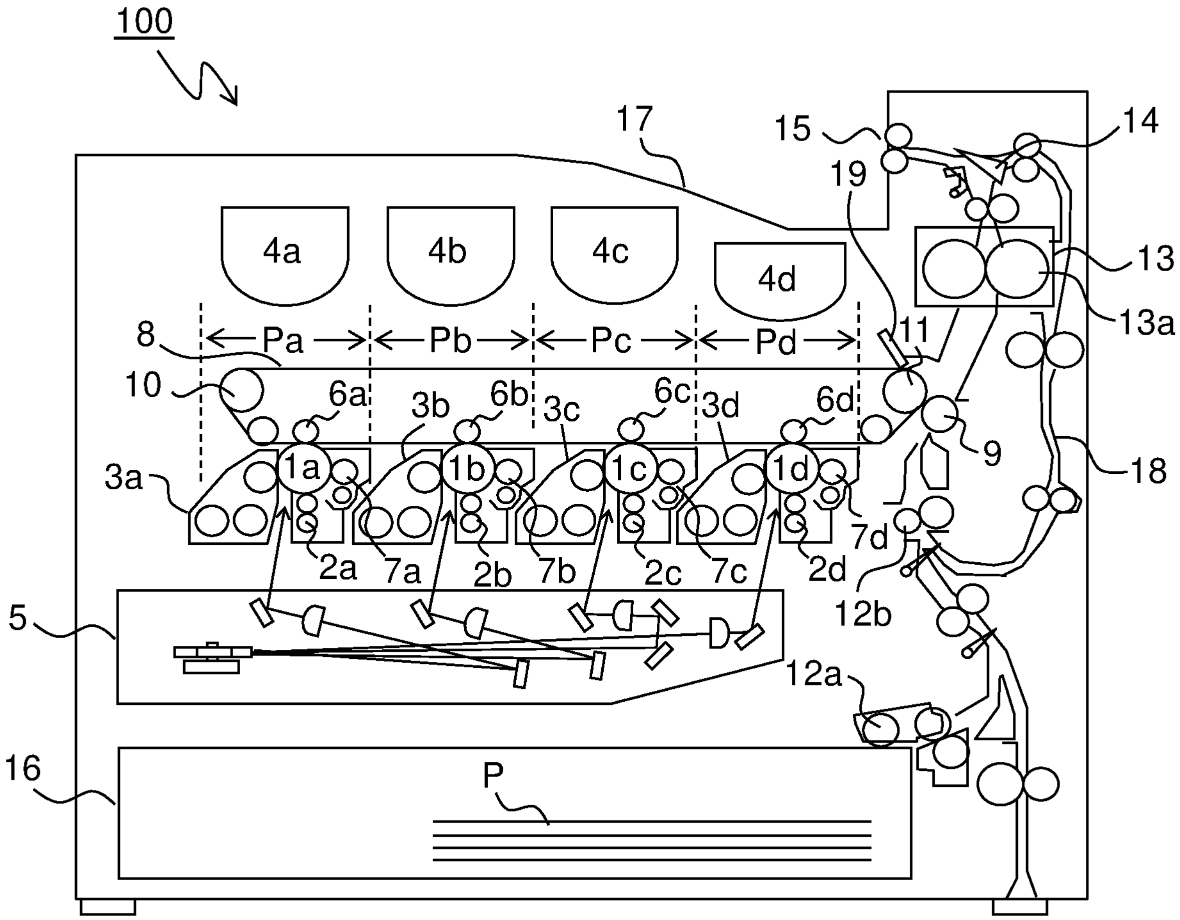
FIG. 1 is a side sectional view showing an internal configuration of an image forming apparatus including a developing device of the present disclosure.

With reference to the appended drawings, the following describes an embodiment of the present disclosure. FIG. 1 is a sectional view showing an internal structure of an image forming apparatus 100 including developing devices 3*a* to 3*d* of the present disclosure. In a main body of the image forming apparatus 100 (herein, a color printer), four image forming portions Pa, Pb, Pc, and Pd are disposed in order from an upstream side in a conveyance direction (a left side in FIG. 1). The image forming portions Pa to Pd are provided correspondingly to images of four different colors (yellow, cyan, magenta, and black), respectively, and sequentially form images of yellow, cyan, magenta, and black, respectively, by individually performing steps of charging, exposure, development, and transfer.

In the image forming portions Pa to Pd, photosensitive drums (image carrying members) 1*a*, 1*b*, 1*c*, and 1*d* are disposed, respectively, to carry visible images (toner images) of the respective colors. Moreover, an intermediate transfer belt (an intermediate transfer member) 8 that is driven by a belt drive motor (not shown) to rotate in a counterclockwise direction in FIG. 1 is provided adjacently to the image forming portions Pa to Pd. Toner images formed respectively on the photosensitive drums 1*a* to 1*d* are sequentially and primarily transferred in a superimposed manner on the intermediate transfer belt 8 moving while abutting on the photosensitive drums 1*a* to 1*d*. After that, the toner images thus primarily transferred on the intermediate transfer belt 8 are secondarily transferred by a secondary transfer roller 9 on a transfer sheet P as an example of a recording medium. Moreover, the toner images secondarily transferred to the transfer sheet P are fixed thereon in a fixing portion 13, and then the transfer sheet P is discharged from the main body of the image forming apparatus 100. An image forming process with respect to the photosensitive drums 1*a* to 1*d* is executed while the photosensitive drums 1*a* to 1*d* are rotated in a clockwise direction in FIG. 1.

The transfer sheet P on which toner images are to be secondarily transferred is housed in a sheet cassette 16 arranged in a lower part of the main body of the image forming apparatus 100. The transfer sheet P is conveyed to a nip between the secondary transfer roller 9 and a driving roller 11 of the intermediate transfer belt 8 via a paper feed roller 12*a* and a registration roller pair 12*b*. As the intermediate transfer belt 8, a seam-free (seamless) belt formed of a dielectric resin sheet is mainly used. Furthermore, a blade-shaped belt cleaner 19 for removing a residual toner or the like remaining on a surface of the intermediate transfer belt 8 is arranged on a downstream side of the secondary transfer roller 9.

Next, a description is given of the image forming portions Pa to Pd. Charging devices 2*a*, 2*b*, 2*c*, and 2*d* that charge the photosensitive drums 1*a* to 1*d*, respectively, an exposure device 5 that performs exposure based on image information with respect to the photosensitive drums 1*a* to 1*d*, developing devices 3*a*, 3*b*, 3*c*, and 3*d* that form toner images on the photosensitive drums 1*a* to 1*d*, respectively, and cleaning devices 7*a*, 7*b*, 7*c*, and 7*d* that remove a residual developer (toner) or the like remaining on the photosensitive drums 1*a* to 1*d*, respectively, are provided around and below the photosensitive drums 1*a* to 1*d* rotatably disposed.

Upon image data being inputted from a host apparatus such as a personal computer, first, surfaces of the photosensitive drums 1*a* to 1*d* are uniformly charged by the charging devices 2*a* to 2*d*, respectively. Then, by the exposure device 5, light is applied thereto so as to correspond to the image data so that electrostatic latent images corresponding to the image data are formed on the photosensitive drums 1*a* to 1*d*, respectively. The developing devices 3*a* to 3*d* are filled with prescribed amounts of two-component developers including toners of yellow, cyan, magenta, and black, respectively. In a case where a percentage of the toners in the two-component developers filled in the developing devices 3*a* to 3*d* falls below a preset value due to after-mentioned toner image formation, the developing devices 3*a* to 3*d* are replenished with fresh supplies of toners from toner containers 4*a* to 4*d*, respectively. The toners in the developers are supplied onto the photosensitive drums 1*a* to 1*d* by the developing devices 3*a* to 3*d*, respectively, and electrostatically adhere thereto. Thus, there are formed toner images corresponding to the electrostatic latent images formed by exposure from the exposure device 5.

Further, by primary transfer rollers 6*a* to 6*d*, an electric field is applied at a prescribed transfer voltage between themselves and the photosensitive drums 1*a* to 1*d*, respectively. Thus, the toner images of yellow, magenta, cyan, and black on the photosensitive drums 1*a* to 1*d* are primarily transferred on the intermediate transfer belt 8. These images are formed in a prescribed positional relationship. After that, a residual toner or the like remaining on the surfaces of the photosensitive drums 1*a* to 1*d* after primary transfer is removed by the cleaning devices 7*a* to 7*d*, respectively, in preparation for subsequent formation of new electrostatic latent images.

The intermediate transfer belt 8 is stretched over a driven roller 10 on an upstream side and the driving roller 11 on a downstream side. As the driving roller 11 is driven to rotate by the belt drive motor (not shown), the intermediate transfer belt 8 starts to rotate in the counterclockwise direction, and then the transfer sheet P is conveyed at prescribed timing from the registration roller pair 12*b* to the nip (a secondary transfer nip) between the driving roller 11 and the secondary transfer roller 9 provided adjacently thereto, where the toner images on the intermediate transfer belt 8 are secondarily transferred on the transfer sheet P. The transfer sheet P on which the toner images have been secondarily transferred is conveyed to the fixing portion 13.

The transfer sheet P conveyed to the fixing portion 13 is heated and pressed by a fixing roller pair 13*a*, and thus the toner images are fixed on a surface of the transfer sheet P to form a prescribed full-color image thereon. A conveyance direction of the transfer sheet P on which the full-color image has been formed is controlled by a branch portion 14 branching off in a plurality of directions, and the transfer sheet P is directly (or after being conveyed to a double-sided conveyance path 18 and subjected to double-sided image formation therein) discharged to a discharge tray 17 by a discharge roller pair 15.

Figure 2:
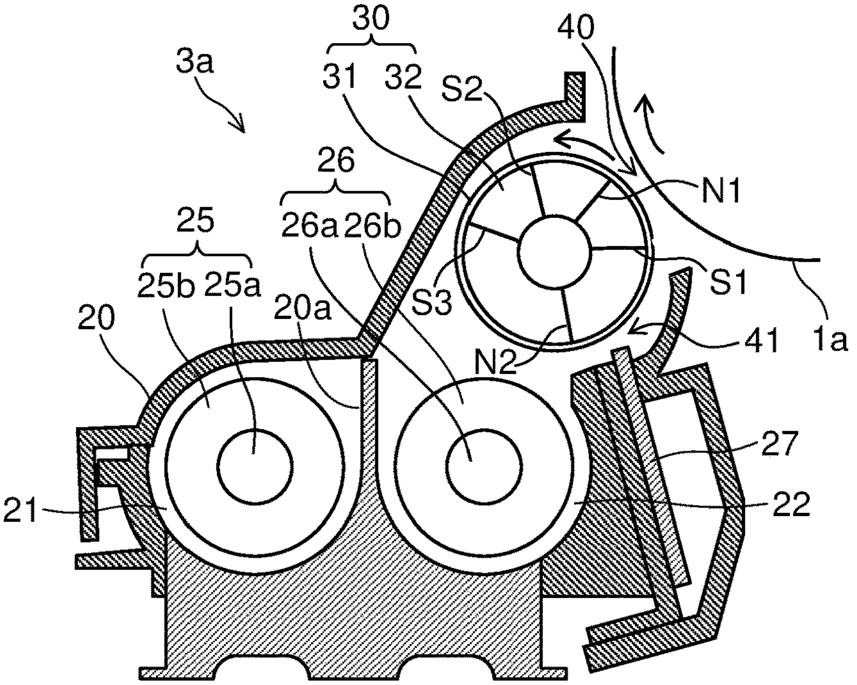
FIG. 2 is a side sectional view of a developing device according to one embodiment of the present disclosure.

FIG. 2 is a side sectional view of the developing device 3*a* mounted in the image forming apparatus 100. While the following exemplarily describes the developing device 3*a* arranged in the image forming portion Pa shown in FIG. 1, the developing devices 3*b* to 3*d* arranged in the image forming portions Pb to Pd, respectively, are basically similar in configuration to the developing device 3*a*, and thus descriptions thereof are omitted.

As shown in FIG. 2, the developing device 3*a* includes a developing container 20 for containing a two-component developer (hereinafter, simply referred to as a developer) including a magnetic carrier and a toner. The developing container 20 is divided by a partition wall 20*a* into a stirring conveyance chamber 21 and a supply conveyance chamber 22. In the stirring conveyance chamber 21 and the supply conveyance chamber 22, a stirring conveyance screw 25 (a first stirring conveyance member) and a supply conveyance screw 26 (a second stirring conveyance member) for making a mixture of a toner supplied from the toner container 4*a* (see FIG. 1) and the magnetic carrier, stirring the mixture, and charging the toner are rotatably disposed, respectively. This embodiment uses a two-component developer composed of a positively chargeable toner and a ferrite/resin-coated carrier. Detailed configurations of the carrier will be described later.

Further, the developer is conveyed while being stirred by the stirring conveyance screw 25 and the supply conveyance screw 26 in an axis direction thereof (a direction vertical to a plane on which FIG. 2 is drawn) and circulates between the stirring conveyance chamber 21 and the supply conveyance chamber 22 via unshown developer passages formed respectively at both ends of the partition wall 20*b*. That is, in the developing container 20, a circulation route of the developer is formed by the stirring conveyance chamber 21, the supply conveyance chamber 22, and the developer passages.

The developing container 20 extends to a diagonally upper right side in FIG. 2, and a developing roller 30 (a developer carrying member) is arranged on a diagonally upper right side of the supply conveyance screw 26 in the developing container 20. Further, a part of an outer circumferential surface of the developing roller 30 is exposed through an opening of the developing container 20 and is opposed at a prescribed distance (a development gap) to the photosensitive drum 1*a*, thus forming a development region 40. The developing roller 30 rotates (performs trail rotation at a position opposed to the photosensitive drum 1*a*) in a counterclockwise direction in FIG. 2.

The stirring conveyance screw 25 includes a rotary shaft 25*a* and a conveyance vane 25*b* that is helically formed at a set pitch on the rotary shaft 25*a* in an axis direction thereof. The rotary shaft 25*a* rotates to cause the stirring conveyance screw 25 to convey, while stirring, the developer present in the stirring conveyance chamber 21 in one direction (a first direction). The supply conveyance screw 26 includes a rotary shaft 26*a* and a conveyance vane 26*b* that is helically formed at a set pitch on the rotary shaft 26*a* in an axis direction thereof. The rotary shaft 26*a* rotates to cause the supply conveyance screw 26 to convey, while stirring, the developer present in the supply conveyance chamber 22 in a direction (a second direction) opposite to the direction of conveyance by the stirring conveyance screw 25.

The developing roller 30 is composed of a cylindrical developing sleeve 31 that rotates in the counterclockwise direction in FIG. 2 and a magnet 32 that has a plurality of magnetic poles and is unrotatably secured in the developing sleeve 31. While the developing sleeve 31 used in this embodiment is a developing sleeve having a knurled surface, it is also possible to use a developing sleeve having a surface with a multitude of concaves (dimples) formed therein, a developing sleeve having a blasted surface, a developing sleeve having a surface not only knurled and including concaves formed therein but also blasted, a developing sleeve having a plated surface intended to improve endurance, a developing sleeve having an anodized surface, or a developing sleeve having a surface treated, after being anodized, by a method in which a metallic salt such as Ni, Sn, or Mo is applied to a porous region of anodized aluminum, i.e., a so-called secondary electrolytic coloring method. Particularly when having an anodized surface or a surface treated, after being anodized, by the secondary electrolytic coloring method, a developing sleeve has not only improved endurance but also an effect of suppressing the occurrence of a development leak. This is because, with the surface of the developing sleeve 31 anodized, a leakage current generated at a magnetic brush becomes unlikely to spread circumferentially on a surface of the developing roller 30 and thus is prevented from developing into a larger-scale leakage current involving adjacent magnetic brushes.

The magnet 32 has a five-pole configuration composed of a main pole N1, a regulation pole (a pumping pole) N2, conveyance poles S1 and S2, and a peeling pole S3. Upon a drive force being inputted to the developing device 3*a*, while the developing sleeve 31 rotates, the magnet 32 remains unrotated. By a development voltage power supply (not shown), a development voltage composed of a direct-current voltage Vdc and an alternating current-voltage Vac is applied to the developing roller 30.

Furthermore, a regulation blade 27 (a regulation member) is attached to the developing container 20 along a longitudinal direction of the developing roller 30 (the vertical direction to the plane on which FIG. 2 is drawn). A slight clearance (gap) is formed between a distal end of the regulation blade 27 and the surface of the developing roller 30, thus forming a regulation portion 41. In this embodiment, a magnetic blade made of stainless steel (SUS430) is used as the regulation blade 27.

A magnetic field (a vertical magnetic force) in a direction of magnetic attraction between the regulation pole N2 of the magnet 32 and the regulation blade 27 is generated, so that a magnetic brush is formed by developer particles linked into chains between the regulation blade 27 and the developing roller 30, and when the magnetic brush passes through the regulation blade 27 (the regulation portion 41), a layer thereof is regulated to a desired height. After that, when the developing sleeve 31 rotates in the counterclockwise direction, by the conveyance pole S1, a magnetic field (a horizontal magnetic force) in a direction along an outer circumferential surface of the developing sleeve 31 is applied, and thus the magnetic brush moves together with the developing sleeve 31. When the magnetic brush has moved to the development region 40, by the main pole N1, a magnetic field (a vertical magnetic force) in a direction of magnetic attraction between the main pole N1 and the photosensitive drum 1*a* is applied, and thus the magnetic brush makes contact with the surface of the photosensitive drum 1*a* and develops an electrostatic latent image thereon.

Moreover, when the developing sleeve 31 rotates further in the counterclockwise direction, by the conveyance pole S2, a magnetic field in a direction along the outer circumferential surface of the developing sleeve 31 is applied, and thus together with the magnetic brush, a part of the developer left unused for toner image formation is collected on the developing sleeve 31. In addition, at the peeling pole S3, which is identical in polarity to the conveyance pole S2, the magnetic brush is separated from the developing roller 30 to fall into the supply conveyance chamber 22. Further, the magnetic brush that has fallen thereinto is stirred and conveyed by the supply conveyance screw 26 and then is used to form a magnetic brush again on the developing sleeve 31 under the magnetic field of the regulation pole N2.

Figure 3:
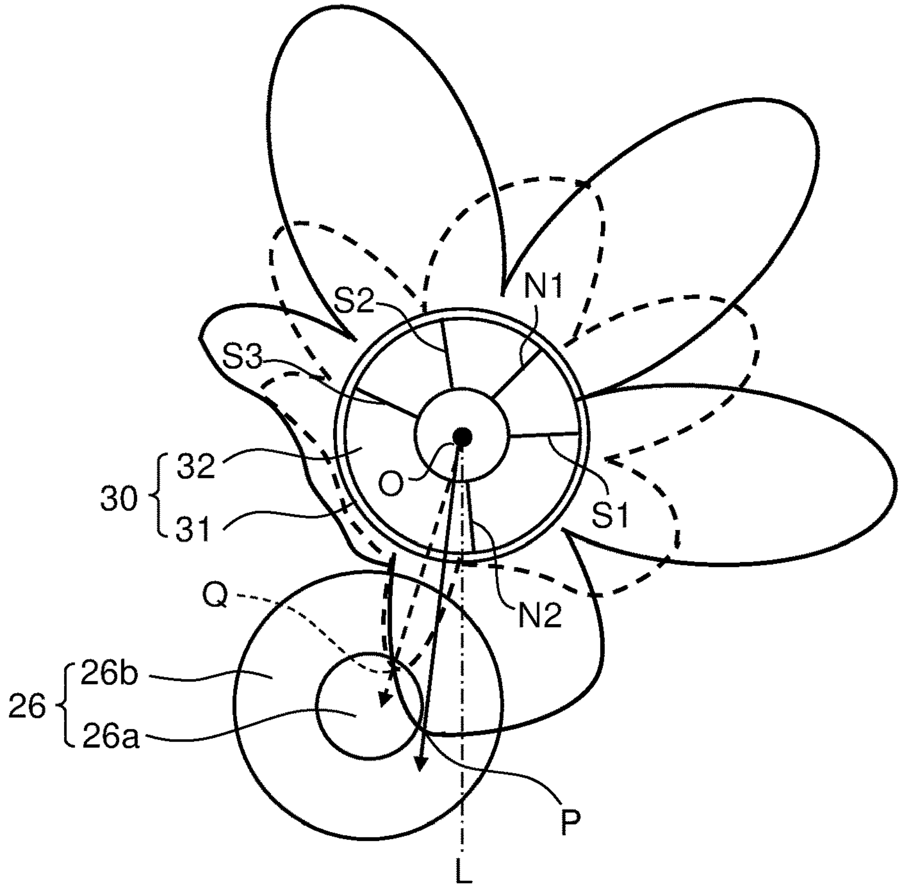
FIG. 3 is a view schematically showing a vertical magnetic force and a vertical magnetic force gradient in a circumferential direction of a developing roller.
Figure 4:
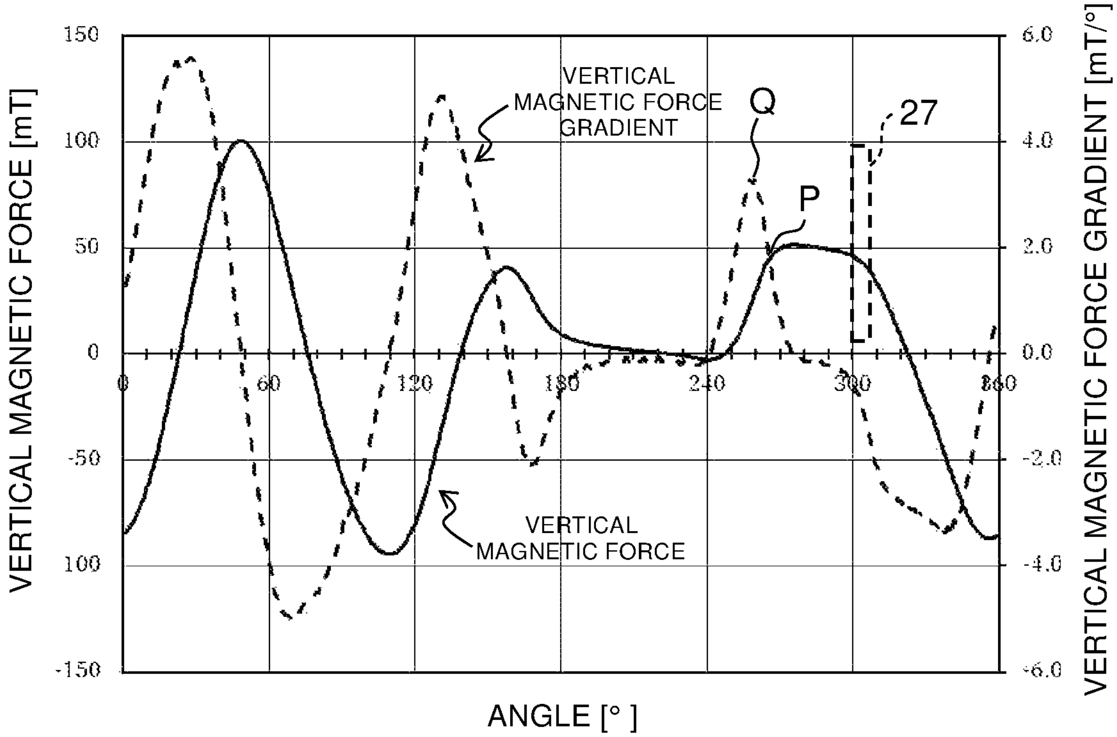
FIG. 4 is a graph showing a vertical magnetic force distribution and variations in vertical magnetic force gradient in the circumferential direction of the developing roller.

Next, a description is given of a magnetic force distribution of the magnet 32 in a circumferential direction of the developing roller 30, which characterises the present disclosure. FIG. 3 is a view schematically showing a vertical magnetic force and a vertical magnetic force gradient of the magnet 32 in the circumferential direction of the developing roller 30. FIG. 4 is a graph showing a vertical magnetic force distribution and variations in vertical magnetic force gradient in the circumferential direction of the developing roller 30. In FIG. 3 and FIG. 4, a vertical magnetic force is shown by a solid line, and a vertical magnetic force gradient is shown by a broken line.

In a configuration in which the regulation pole N2 serves also as the pumping pole (the catching pole) that pumps the developer to the developing roller 30 as in this embodiment, mechanical stress on the developer generated in the regulation portion 41 can be reduced to suppress deterioration of the toner. In this case, while it is possible to further reduce the stress on the developer by reducing a vertical magnetic force of the regulation pole N2 and setting the vertical magnetic force to have a region that exhibits a flat distribution, when the regulation pole N2 has such a reduced magnetic force, regulation stability in the regulation portion 41 (stability of a magnetic regulation force at the regulation blade 27) might be decreased.

A magnetic attraction force by which the developer is attracted to the developing roller 30 increases with increasing vertical magnetic force gradient [mT/°] of the regulation pole N2. Furthermore, the closer a peak of the vertical magnetic force gradient is to the supply conveyance screw 26, the more easily the developer being conveyed by the supply conveyance screw 26 is pumped by the magnetic attraction force onto the developing roller 30.

From this viewpoint, in this embodiment, in the configuration in which the regulation pole and the pumping pole are constituted of a single magnetic pole, there is used the regulation pole N2 that has a region extending over 10° or more in which a vertical magnetic force is not more than 65 [mT] and a vertical magnetic force gradient is not more than 0.3 [mT/°]. Further, a peak position (Point Q in FIG. 3) of the vertical magnetic force gradient of the regulation pole N2 is arranged at a position opposed to the supply conveyance screw 26. Specifically, a direction (a broken line arrow in FIG. 3) of a peak of the vertical magnetic force gradient from a center axis O of the magnet 32 is set to overlap with the supply conveyance screw 26 when viewed from the axis direction.

With this configuration, it is possible to ensure performance in supplying the developer from the supply conveyance screw 26 (pumping performance of the regulation pole N2). Particularly when the peak position of the vertical magnetic force gradient of the regulation pole N2 is arranged at a position opposed to the rotary shaft 26*a* of the supply conveyance screw 26 as shown in FIG. 3, it becomes further easier to ensure the developer supplying performance.

Furthermore, when, in addition to the configuration in which the peak position (Point Q in FIG. 3) of the vertical magnetic force gradient is opposed to the rotary shaft 26*a* of the supply conveyance screw 26, a peak position (Point P in FIG. 3) of the vertical magnetic force is opposed to the supply conveyance screw 26 as shown in FIG. 3, the developer is pumped more reliably.

Moreover, the larger the vertical magnetic force gradient and the vertical magnetic force at the peak position of the vertical magnetic force gradient, the more the pumping performance at the regulation pole N2 is improved. In this embodiment, when a value of the vertical magnetic force gradient and a value of the vertical magnetic force at the peak position (Point Q in FIG. 3) of the vertical magnetic force gradient of the regulation pole N2 are indicated as A [mT/°] and K[mT], respectively. $A \geq 2.8$ and $A \times K \geq 62.5$ are satisfied. Thus, as shown in after-mentioned examples, it is possible to suppress unevenness in supplying the developer (unevenness corresponding to a pitch of the supply conveyance screw 26).

As described above, in the configuration in which the regulation pole N2 serves also as the pumping pole, the vertical magnetic force gradient and a peak position and a magnitude of the vertical magnetic force of the regulation pole N2 are set to satisfy prescribed conditions, and thus it is possible to ensure regulation stability in the regulation portion 41 and to ensure developer pumping performance. As a result, it is also possible to maintain developability in the development region 40.

Furthermore, in each of the developing devices 3*a* to 3*d* of this embodiment, as shown in FIG. 3, a normal L passing through the center axis O of the magnet 32 of the developing roller 30 is positioned on a left side relative to an outer edge (a right end in FIG. 3) of the conveyance vane 26*b* of the supply conveyance screw 26. That is, the normal L passing through the center axis O of the magnet 32 is at a position overlapping with the supply conveyance screw 26 when viewed from the axis direction.

When the developing roller 30 and the supply conveyance screw 26 are in such a positional relationship, while the developing devices 3*a* to 3*d* can be reduced in dimension in a width direction thereof (a left-right direction in FIG. 2), it is hard for the regulation pole N2 to pump the developer. Accordingly, it is particularly effective to set the vertical magnetic force gradient and the peak position and magnitude of the vertical magnetic force of the regulation pole N2 as in this embodiment.

Next, a description is given of a method for measuring the vertical magnetic force gradient of the magnet 32 of the developing roller 30. In this embodiment, the developing roller 30 was attached to an angle adjusting jib, and while the developing roller 30 was rotated for every set angle, the measurement was performed using a magnetic force measuring device (GAUSS METER Model GX-100 produced by Nihon Denji Sokki Co., Ltd.). While when measurement accuracy is extremely high, the vertical magnetic force gradient can be determined by dividing a difference between values of the vertical magnetic force measured at different angles by a difference in measurement angle, when the measurement accuracy is low, the vertical magnetic force gradient cannot be determined with accuracy. For this reason, in the present disclosure, the vertical magnetic force was measured at a measurement angle varied by 0.02°, and (a difference between values of the vertical magnetic force at angles different by 0.08°/0.08°) was defined to be a gradient 1 at a middle point within a range of the angles different by 0.08°. Further, an average gradient per 2° of the gradient 1 was used as the vertical magnetic force gradient. Table 1 shows an example of the measurement of the vertical magnetic force gradient.

TABLE 1

| Angle | Vertical Magnetic Force | Gradient 1 | | Average Gradient | |
|---|---|---|---|---|---|
| [°] | [mT] | [mT/°] | Calculations Method | [mT/°] | Calculation Method |
| 10.00 | 24.7 | 6.25 | (Vertical Magnetic Force Difference Between Values at 9.96° and 10.04°)/0.08 | 6.13 | Average of Values of Gradient 1 at 9.00° to 11.00° |
| 10.02 | 24.5 | 6.25 | (Vertical Magnetic Force Difference Between Values at 9.98° and 10.06°)/0.08 | 6.15 | Average of Values of Gradient 1 at 9.02° to 11.02° |
| 10.04 | 24.4 | 6.25 | (Vertical Magnetic Force Difference Between Values at 10.00° and 10.08°)/0.08 | 6.15 | Average of Values of Gradient 1 at 9.04° to 11.04° |
| 10.06 | 24.3 | 5 | (Vertical Magnetic Force Difference Between Values at 10.02° and 10.10°)/0.08 | 6.15 | Average of Values of Gradient 1 at 9.06° to 11.06° |
| 10.08 | 24.2 | 5 | (Vertical Magnetic Force Difference Between Values at 10.04° and 10.12°)/0.08 | 6.18 | Average of Values of Gradient 1 at 9.08° to 11.08° |
| 10.10 | 24.1 | 6.25 | (Vertical Magnetic Force Difference Between Values at 10.06° and 10.14°)/0.08 | 6.18 | Average of Values of Gradient 1 at 9.10° to 11.10° |
| 10.12 | 24 | 6.25 | (Vertical Magnetic Force Difference Between Values at 10.08° and 10.16°)/0.08 | 6.18 | Average of Values of Gradient 1 at 9.12° to 11.12° |
| 10.14 | 23.8 | 6.25 | (Vertical Magnetic Force Difference Between Values at 10.10° and 10.18°)/0.08 | 6.20 | Average of Values of Gradient 1 at 9.14° to 11.14° |
| 10.16 | 23.7 | 6.25 | (Vertical Magnetic Force Difference Between Values at 10.12° and 10.20°)/0.08 | 6.20 | Average of Values of Gradient 1 at 9.16° to 11.16° |

In Table 1, for example, the gradient 1 at an angle of 10.00° has a value (6.25 [mT/°]) obtained by dividing a difference G1–G2 between a vertical magnetic force G1 at 9.96° and a vertical magnetic force G2 at 10.04° by 0.08°. Furthermore, the average gradient at 10.00° has a value (6.13 [mT/°]) that is an average of values of the gradient 1 per 2° between 9.00° and 11.00° (2°/0.02°=100 values).

Next, a description is given of the carrier used in the developing devices 3*a* to 3*d* of this embodiment. The carrier used herein includes a carrier core that is a particle of a magnetic substance and a coat layer that is made of a silicone resin or the like and is formed on a surface of the carrier core. A silicone-based resin can be applied to form a thin coat film, thus enhancing uniformity of the coat layer. Furthermore, the smaller a thickness of the coat layer, the higher a capacitance of the coat layer, and thus an effect of a ferroelectric substance added to the coat layer becomes likely to be exerted.

The carrier can be of a varying shape from indefinite to spherical. Moreover, as the carrier, a carrier having an average particle diameter of not less than 20 μm and not more than 65 μm can be used. When having a number-average particle diameter of not more than 65 μm, the carrier is increased in specific surface area and thus can carry an increased amount of the toner. Thus, a toner concentration in a magnetic brush can be maintained high, and the toner is therefore sufficiently supplied to the developing roller 30, so that a toner layer having a sufficient thickness can be formed. As a result, it is possible to cause a sufficient amount of the toner to fly from the toner layer to an electrostatic latent image on a photosensitive member, to suppress a decrease in image density, and to suppress unevenness in the image density. Furthermore, since the toner is sufficiently supplied to the developing roller 30, it becomes unlikely that a toner dropout region is formed in the toner layer of the developing roller 30, thus suppressing the occurrence of a hysteresis.

When the carrier has an average particle diameter smaller than 20 μm, there occurs carrier development in which the carrier adheres to the photosensitive drums 1*a* to 1*d*. The carrier that has adhered thereto might shift to the intermediate transfer belt 8 to cause a transfer void or move to the belt cleaner 19 to cause a cleaning failure. Furthermore, when the carrier has an average particle diameter larger than 65 μm, with the toner in the two-component developer moving from the developing roller 30 to any of the photosensitive drums 1*a* to 1*d*, a coarse magnetic brush of the two-component developer is formed to degrade image quality.

Examples of a material of the carrier core include magnetic metals such as iron, nickel, and cobalt, alloys thereof, alloys containing rare earths, soft ferrites such as hematite, magnetite, manganese-zinc-based ferrite, nickel-zinc-based ferrite, manganese-magnesium-based ferrite, and lithium-based ferrite, iron-based oxides such as copper-zinc-based ferrite, and mixtures thereof. The carrier core is produced by a known method such as sintering or atomization. Among carriers made of the above-described materials, ferrite carriers have excellent fluidity and are also chemically stable and thus are favorably used from viewpoints of enhancing image quality and prolonging a service life.

As the ferroelectric substance, barium titanate particles are added to the coat layer. While hydrothermal polymerization, an oxalate method, or the like is used to produce barium titanate, barium titanate has physical properties varying depending on a production method thereof. When produced by the hydrothermal polymerization in particular, barium titanate has hollows therein and thus has a small absolute specific gravity and a sharp particle diameter distribution. As a result, compared with a case of being produced by any other production method, barium titanate produced by the hydrothermal polymerization has excellent dispersibility in a coat resin and thus can be dispersed uniformly. Accordingly, charging performance of the carrier is also made uniform, and thus the hydrothermal polymerization is suitably used in the present disclosure.

Preferably, barium titanate has a volume average particle diameter of not less than 100 nm and not more than 500 nm. When having a particle diameter smaller than 100 nm, barium titanate is abruptly decreased in relative dielectric constant, so that an effect thereof related to the relative dielectric constant is reduced. On the other hand, when having a particle diameter of not less than 500 nm, barium titanate can hardly be uniformly dispersed in the coat layer.

When barium titanate is added in an amount of not less than 5 parts by mass with respect to a coat weight, an effect of stabilizing a charge amount starts to manifest itself, and when barium titanate is added in an amount of not less than 25 parts by mass with respect thereto, the effect of stabilizing a charge amount is more remarkably exhibited. When added in an excessively large amount, however, barium titanate can no longer be completely contained in the coat layer and might be partly liberated from the coat layer. A liberated part of the barium titanate might move to the photosensitive drums 1*a* to 1*d* and further into an edge part of a cleaning blade of each of the cleaning devices 7*a* to 7*d*, resulting in causing a cleaning failure. Particularly in a method in which toners in the toner containers 4*a* to 4*d* are each mixed with a carrier and then are replenished to the developing devices 3*a* to 3*d*, respectively, a part of barium titanate liberated through use thereof is supplied to the developing devices 3*a* to 3*d* to increase a load on the cleaning blade. For this reason, barium titanate is added in an amount of preferably not less than 5 parts by mass and not more than 45 parts by mass and more preferably not less than 25 parts by mass and not more than 45 parts by mass.

As an electric conductor, carbon black is added to the coat layer. When the carbon black is added in an excessively large amount, a part of the carbon black liberated from the coat layer might adhere to the toner, causing color turbidity of toners of colors other than black. On the other hand, when the carbon black is added in an excessively small amount, it is unlikely that electric charge moves from the carrier to the toner, resulting in a failure to cause a smooth increase in toner charge amount. In the carrier of the present disclosure, barium titanate (the ferroelectric substance) is added to the coat layer so that a carrier resistance is decreased, and thus an amount of carbon black to be added can be reduced by an amount corresponding to a decrease in the carrier resistance.

Adding the ferroelectric substance (barium titanate) to the coat layer enhances an electric charge retaining capability of the carrier, thus enabling sufficient electric charge to be applied to the toner. Furthermore, adding the electric conductor (carbon black) to the coat layer enables smooth movement of electric charge from the carrier to the toner. Even when a toner concentration is increased to increase the number of toner particles to be charged, synergy between the above-described two additives enables electric charge to be applied to a saturation level of a charge amount of the toner particles.

Furthermore, barium titanate having a high hardness is added as the ferroelectric substance to the coat layer of the carrier, so that abrasion of the coat layer is reduced, thus making it possible to achieve a longer service life of the carrier. Furthermore, with barium titanate added, a carrier resistance is decreased compared with a case where only carbon black is added, and thus an amount of carbon black to be added can be reduced. As a result, it is possible to suppress color turbidity resulting from adhesion of carbon black to the toner. Moreover, the carrier is improved in electric charge imparting performance, and thus even when a toner concentration in the developer is increased, a variation in toner charge amount is reduced. As a result, the toner charge amount is stabilized to reduce variations in bulk of the developer in the developing container 20, and thus the pumping performance at the regulation pole N2 is stabilized, so that the developer can be stably supplied to the developing roller 30.

Other than the above, the present disclosure is not limited to the foregoing embodiment and can be variously modified without departing from the spirit of the present disclosure. For example, while in the foregoing embodiment, the magnet 32 of the developing roller 30 has a configuration in which the conveyance pole S1 is arranged between the regulation pole N2 and the main pole N1, it is also possible to use a magnet in which a main pole is arranged on a downstream side of a regulation pole. In that case, the regulation pole and the main pole are different in polarity.

Furthermore, while the foregoing embodiment exemplarily describes the color printer shown in FIG. 1 as the image forming apparatus 100, the present disclosure is not limited to a color printer and is applicable also to various types of image forming apparatuses including a developing device that employs the two-component development method, such as monochrome and color copy machines, a monochrome printer, and a digital multi-functional peripheral. The following more specifically describes the effects of the present disclosure with reference to examples.

Example 1

[Production of Carrier Containing Ferroelectric Particles]

By use of a homomixer, 200 parts by mass of a silicone resin (KR-255 produced by Shin-Etsu Chemical Co., Ltd. and having a nonvolatile content of 50%), 20 parts by mass of barium titanate (produced by Sakai Chemical Industry Co., Ltd. and having a volume average particle diameter of 304 nm), 7 parts by mass of carbon black (Ketjenblack EC produced by Lion Corporation), and 800 parts by mass of toluene were dispersed to provide a coat solution. The coat solution thus obtained was sprayed using a fluidized-bed coating device over 5 kg of a carrier core (an Mn ferrite carrier having a volume average particle diameter of 34.7 μm, a saturation magnetization of 80 emu/g, and a coercive force of 8 Oe and produced by Dowa IP Creation Co., Ltd.) under heating at 70° C. to 80° C. so that the carrier core was coated with the coat solution. After that, the carrier core was calcined for an hour at 200° C. to 250° C. using an electric furnace, was cooled down, and then was crushed and classified using a sieve to provide a carrier that included a coat laver containing ferroelectric particles.

Example 2

[Evaluation of Stability in Supplying Developer when Peak Position of Vertical Magnetic Force Gradient is Varied]

In the image forming apparatus 100 shown in FIG. 1, there was performed an evaluation of stability in supplying a developer when a peak position of a vertical magnetic force gradient of the regulation pole N2 of the developing roller 30 is varied. A test was performed in the image forming portion Pd for black including the photosensitive drum 1*d* and the developing device 3*d*.

In a test method, developing devices 3*d* configured as shown in FIG. 2 (Disclosed Examples 1 to 3 and Comparative Examples 1 and 2) were each mounted in a test apparatus as shown in FIG. 1. The developing devices 3*d* were varied in terms of a vertical magnetic force gradient A and a vertical magnetic force K at a peak position (Point Q in FIG. 3) of the vertical magnetic force gradient of the regulation pole N2, a maximum value of a vertical magnetic force of the regulation pole N2, an angle at which the vertical magnetic force gradient has a value of −0.3 to 0.3 [mT/°], and an opposed state between the peak positions of the vertical magnetic force gradient and the vertical magnetic force and the supply conveyance screw 26.

Using this test apparatus, there was visually observed unevenness in image density (periodic unevenness) that occurred at pitch intervals of the conveyance vane 26*b* of the supply conveyance screw 26 in a case of continuous printing of 10 sheets of black solid images.

Image formation conditions were as follows. That is, a printing velocity (a process velocity) was set to 55 sheets per minute, and a developing sleeve 31 having an outer circumferential surface in which 120 rows of concaves were formed (knurled) and an outer diameter of 16 mm was used in the developing roller 30. Used as the regulation blade 27 was a magnetic blade made of stainless steel (SUS430) and having a thickness of 1.5 mm, and a distance (a regulation gap) between the regulation blade 27 and the developing roller 30 was set to 0.45±0.03 mm. A development voltage obtained by superimposing an alternating-current voltage having a peak-to-peak value (Vpp) of 1200 V, a frequency of 6 kHz, and a duty of 50% on a direct-current voltage of 250 V was applied to the developing roller 30.

The photosensitive drum 1*d* was formed of an amorphous silicon (a-Si) photosensitive member having a relative dielectric constant of 11, the developing roller 30 was set to rotate (perform trail rotation at an opposed position) at a circumferential velocity ratio of 1.8 with respect to the photosensitive drum 1*d*, and a distance (a DS (drum-sleeve) distance) between the photosensitive drum 1*d* and the developing roller 30 was set to 0.350±0.025 mm. Furthermore, an elastic belt was used as the intermediate transfer belt 8.

A positively chargeable toner having an average particle diameter of 6.8 μm was used as a toner, and a resin-coated carrier produced in Example 1 was used as a carrier. An initial toner concentration (a weight ratio of the toner to the carrier) in the developer was set to 6%.

An evaluation method was adopted in which a case where no periodic unevenness occurred was indicated as "E (excellent)." a case where periodic unevenness occurred but was hardly noticeable as "G (good)," a case where slight periodic unevenness occurred as "F (fair)," and a case where the occurrence of periodic unevenness was obviously seen as "P (poor)." Table 2 shows results of the evaluation together with the vertical magnetic force gradient A, the vertical magnetic force K, the maximum value of the vertical magnetic force of the regulation pole N2, the angle at which the vertical magnetic force gradient had a value of −0.3 to 0.3 [mT/°] and the opposed state between the peak positions of the vertical magnetic force gradient and the vertical magnetic force and the supply conveyance screw 26.

Furthermore, a comparison among Disclosed Examples 1 to 3 found that the larger values of A and A×K, the more the occurrence of periodic unevenness was suppressed. Particularly in Disclosed Example 1 in which the peak position (Point P) of the vertical magnetic force is opposed to the supply conveyance screw 26, no occurrence of periodic unevenness was observed.

On the other hand, in each of the developing devices 3*d* of Comparative Examples 1 and 2 in which, while the peak position (Point Q) of the vertical magnetic force gradient of the regulation pole N2 was opposed to the supply conveyance screw 26, A≥2.8 and A×K≥62.5 were not satisfied, periodic unevenness occurred significantly.

The above-described results have confirmed that the occurrence of periodic unevenness can be effectively suppressed by using a configuration in which the peak position of the vertical magnetic force gradient of the regulation pole N2 is opposed to the supply conveyance screw 26, and a vertical magnetic force distribution is set so that a value of the vertical magnetic force gradient A and a value of the vertical magnetic force K [mT] at the peak position of the vertical magnetic force gradient satisfy A≥2.8 and A×K≥62.5.

While the results described above were obtained by using the resin-coated carrier containing barium titanate added thereto as ferroelectric particles, which was produced in Example 1, it has been confirmed that similar effects can be obtained also by using other types of carriers.

The present disclosure is usable in a developing device that employs a two-component development method using a two-component developer including a toner and a carrier. Through the use of the present disclosure, it is possible to provide a developing device that, in a case where a regulation pole and a pumping pole are constituted of a common magnetic pole in the two-component development method, is capable of ensuring regulation stability, while reducing stress on a developer, and also improving developer pumping performance, and an image forming apparatus including the same.

What is claimed is:

1. A developing device, comprising:

TABLE 2

| | Peak Posidon Q of Vertical Magnetic Force Gradient | | | Peak Position P of Vertical Magnetic Force | Angle at Which Vertical Magnetic Force Gradient at Regulation Pole is -0.3 to 0.3 [mT/°] | Opposed State to Supply Conveyance Screw | | |
|---|---|---|---|---|---|---|---|---|
| | A | K | A × K | | | | | |
| | [mT/°] | [mT] | [mT/°] × [mT] | [mT] | [°] | Q | P | Evaluation |
| Disclosed Example 1 | 3.3 | 26.6 | 87.8 | 51.3 | 22.4 | G | G | E |
| Disclosed Example 2 | 3.0 | 24.8 | 74.4 | 62.1 | 20.1 | G | P | G |
| Disclosed Example 3 | 2.8 | 22.1 | 62.5 | 59.8 | 11.7 | G | P | P |
| Comparative Example 1 | 2.5 | 17.0 | 41.6 | 43.7 | 18.2 | G | P | P |
| Comparative Example 2 | 1.7 | 26.7 | 45.4 | 55.2 | 29.7 | G | P | P |

As is apparent from Table 2, it was confirmed that the occurrence of periodic unevenness was suppressed in each of the developing devices 3*d* of Disclosed Examples 1 to 3 in which the peak position (Point Q) of the vertical magnetic force gradient of the regulation pole N2 was opposed to the supply conveyance screw 26, and a value of the vertical magnetic force gradient A and a value of the vertical magnetic force K [mT] at the peak position of the vertical magnetic force gradient satisfied A≥2.8 and A×K≥62.5.

a developing container that includes a plurality of conveyance chambers including a first conveyance chamber and a second conveyance chamber that are arranged mutually side by side and contains a two-component developer including a magnetic carrier and a toner;

a first stirring conveyance member that conveys, while stirring, the developer present in the first conveyance chamber in a first direction;

a second stirring conveyance member that conveys, while stirring, the developer present in the second conveyance chamber in a second direction opposite to the direction of conveyance by the first stirring conveyance member;

a developer carrying member that is rotatably supported to the developing container and carries, on an outer circumferential surface thereof, the developer present in the second conveyance chamber; and a regulation member that is arranged to be opposed at a prescribed distance to the developer carrying member, the developing device being configured to develop an electrostatic latent image formed on a surface of an image carrying member into a toner image, wherein the developer carrying member includes:

a developing sleeve that is rotatable, carries the developer, and has a surface on which a magnetic brush is formed; and a magnet that is unrotatably secured in the developing sleeve and has a plurality of magnetic poles circumferentially arranged at prescribed intervals, which includes a regulation pole that is arranged at a position opposed to the regulation member and a main pole that is arranged on a downstream side of the regulation pole with respect to a rotation direction of the developing sleeve, in the magnet, the regulation pole and a pumping pole that pumps the developer supplied from the second stirring conveyance member to the developer carrying member are constituted of a single magnetic pole, and the regulation pole has a region extending over 10° or more in which a maximum value of a vertical magnetic force is not more than 65 [mT] and a vertical magnetic force gradient is not more than 0.3 [mT/° ], and a peak position of the vertical magnetic force gradient of the regulation pole is arranged at a position opposed to the second stirring conveyance member, and when a value of the vertical magnetic force gradient at the peak position of the vertical magnetic force gradient and a value of the vertical magnetic force at the peak position of the vertical magnetic force gradient are indicated as A [mT/° ] and K [mT], respectively, $A \geq 2.8$ and $A \times K \geq 62.5$ are satisfied.

2. The developing device according to claim 1, wherein the peak position of the vertical magnetic force gradient of the regulation pole is arranged at a position opposed to a rotary shaft of the second stirring conveyance member.

3. The developing device according to claim 1, wherein a peak position of the vertical magnetic force of the regulation pole is arranged at a position opposed to the second stirring conveyance member.

4. The developing device according to claim 1, wherein the developing sleeve and the magnet each have a cylindrical shape, and a vertical line passing through a center axis of the magnet is at a position overlapping with the second stirring conveyance member when viewed from an axis direction.

5. The developing device according to claim 1, wherein the carrier includes:

a carrier core that is a particle of a magnetic substance; and a coat layer that is made of a resin and is formed on a surface of the carrier core, the coat layer containing carbon black as an electric conductor and barium titanate as a ferroelectric substance, and the barium titanate has a volume average particle diameter of not less than 100 nm and not more than 500 nm and is added in an amount of 5 to 45 parts by mass with respect to 100 parts by mass of a coat resin forming the coat layer.

6. The developing device according to claim 5, wherein the barium titanate is added in an amount of 25 to 45 parts by mass with respect to 100 pars by mass of the coat resin.

7. An image forming apparatus, comprising:

the image carrying member having the surface on which a photosensitive layer is formed; and the developing device according to claim 1 that causes the toner to adhere to the electrostatic latent image formed on the image carrying member so as to form a toner image thereon.

* * * * *